United States Patent
Li et al.

(10) Patent No.: US 11,120,710 B1
(45) Date of Patent: Sep. 14, 2021

(54) PRESSURE OSCILLATION SIMULATION DEVICE OF DEEP COALBED METHANE AND METHOD THEREOF

(71) Applicants: Southwest Petroleum University, Sichuan Province (CN); CHENGDU KANGPUSHEN PETROLEUM TECHNOLOGY DEVELOPMENT CO., LTD, Sichuan Province (CN); Chengdu University of Technology, Sichuan Province (CN)

(72) Inventors: Xiangchen Li, Sichuan Province (CN); Fan Zhang, Sichuan Province (CN); Shan Yang, Chengdu (CN); Yi Lin, Mianyang (CN); Yousheng Chen, Jiangxi Province (CN)

(73) Assignees: Southwest Petroleum University, Chengdu (CN); CHENGDU KANGPUSHEN PETROLEUM TECHNOLOGY DEVELOPMENT CO., LTD, Chengdu (CN); Chengdu University of Technology, Chengdu (CN)

( * ) Notice: Subject to any disclaimer, the term of this patent is extended or adjusted under 35 U.S.C. 154(b) by 0 days.

(21) Appl. No.: 17/320,242

(22) Filed: May 14, 2021

(30) Foreign Application Priority Data

Oct. 10, 2020 (CN) .......................... 202011076979.2

(51) Int. Cl.
*G09B 25/02* (2006.01)
*G01F 23/296* (2006.01)
*E21B 43/00* (2006.01)

(52) U.S. Cl.
CPC ............ *G09B 25/02* (2013.01); *E21B 43/006* (2013.01); *G01F 23/296* (2013.01)

(58) Field of Classification Search
CPC ...... G09B 25/02; E21B 43/006; G01F 23/296
USPC .......................................................... 702/6
See application file for complete search history.

(56) References Cited

U.S. PATENT DOCUMENTS 10,738,578 B2 * 8/2020 Chuprakov ............. E21B 49/00
2011/0308790 A1 * 12/2011 Strapoc .................. C12P 5/023
166/250.01

FOREIGN PATENT DOCUMENTS

CN         108119128 A        6/2018

* cited by examiner

*Primary Examiner* — Aditya S Bhat

(57) ABSTRACT

The invention relates to a pressure oscillation simulation device of deep coalbed methane and a method thereof. The device includes: a box, a liquid discharge pipe arranged on a bottom portion of the box, a gas source connected to the box through a gas injection pipe, a water source connected to the box through a drainpipe that includes a branch pipe; a measuring system including a pressure measuring member and a liquidometer. The present disclosure can simulate the coalbed pressure oscillation in a coalbed gas exploitation process and be of simple structure and high reliability, and can simulate influences of the pressure oscillation on a wellbore and a stratum environment in the coalbed exploitation process to provide reliable data support for an actual coalbed exploitation; the simulation method of the present disclosure can accurately simulate the pressure oscillation of the wellbore and the stratum.

6 Claims, 1 Drawing Sheet

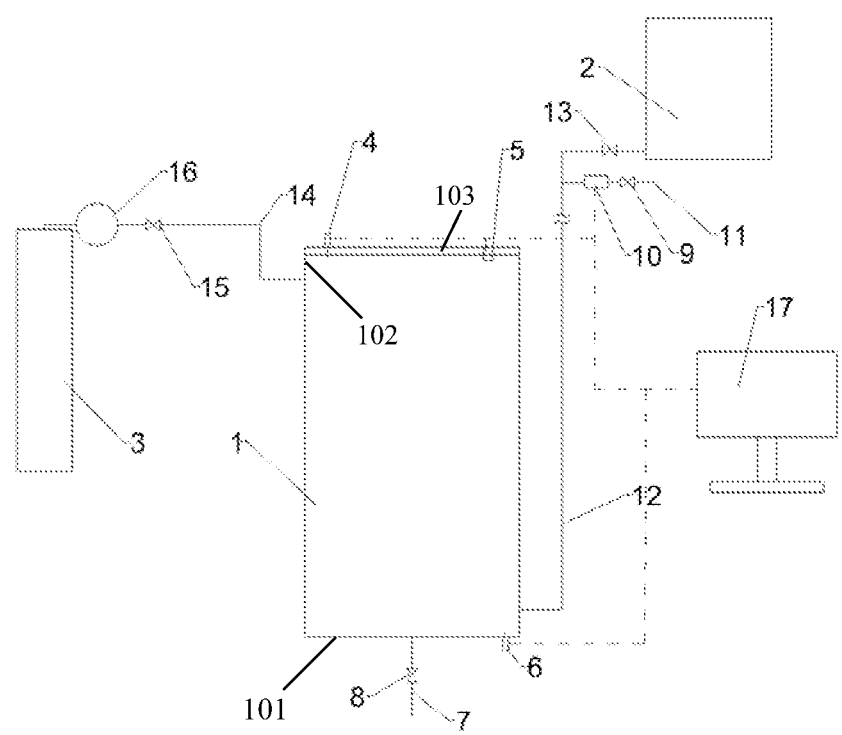

PRESSURE OSCILLATION SIMULATION DEVICE OF DEEP COALBED METHANE AND METHOD THEREOF

CROSS-REFERENCE TO RELATED APPLICATION

This application claims priority to Chinese Patent Application No. 202011076979.2, entitled "PRESSURE OSCILLATION SIMULATION DEVICE OF DEEP COALBED METHANE AND METHOD THEREOF" and filed on Oct. 10, 2020, the content of which is hereby incorporated by reference in its entirety.

BACKGROUND

Technical Field

The present disclosure generally relates to a technical field of coalbed methane development, and especially relates to a pressure oscillation simulation device of deep coalbed methane and a pressure oscillation simulation method of the deep coalbed methane by using the device.

Description of Related Art

Coalbed methane is a new type of clean energy and is an unconventional natural gas that is generated and stored by a coalbed itself. China is rich of coalbed methane resources, and is the third largest CBM reservoir country after Russia and Canada. Deep coalbed methane resources in China account for the largest proportion, and the deep coalbed methane resources buried below 1000 m can reach $22.45 \times 10^{12}$ m$^3$, which account for 61.2% of total resources. Pilot test development of the deep coalbed methane in the Pinsons Basin of United States, the Alberta Basin of Canada and the Cooper Basin of Australia is provided a theoretical support for deep coalbed methane industry in China. In recent years, main exploration and test areas of the deep coalbed methane in China are Qinshui (buried depths of 1100~1300 m), an eastern margin of Ordos (buried depths of 1300~500 m), an eastern of Yunnan and a western of Guizhou, and Junggar (buried depths of 1000~583 m). Furthermore, the Upper Paleozoic Benxi, the Taiyuan and the Shanxi Formations of the Upper Paleozoic Carboniferous in the northeastern margin of the Ordos Basin are main strata for exploration and development of the deep coalbed methane in China.

In the deep coalbed methane exploitation, a temperature and a pressure of gas are lowered when it is lifted in a wellbore, so that the condensate water is deposited at a bottom of a well; when the condensate water that has been deposited reaches a certain height, a pressure generated by the condensate water is greater than a pressure that a coal rock is fractured, thereby a reservoir is fractured and the yield of a gas well is increased, and then, liquid flows down from a fracturing crack into the reservoir and the height of the condensate water drops. When the pressure of the condensate water is not enough to maintain opening the fracturing crack, the fracturing crack can be closed instantly. At this time, because the fracturing crack is closed, water impact pressure is generated at the bottom of the wellbore, and then pressure oscillation caused by the water impact pressure can be transmitted in the wellbore so that the liquid in the wellbore can be ejected out of the wellbore due to the pressure oscillation. In this way, coalbed transformation can be realized through a cyclic reciprocation of the whole process so as to improve the yield of the gas well. Pressure oscillation conditions in the deep CBM development process are known to be helpful understand underground working conditions, so as to provide powerful technical and data support for the deep CBM development. Therefore, there is an urgent need for a device and a method for simulating the pressure oscillation generated during the deep CBM exploitation.

SUMMARY

The technical problems to be solved: in view of the shortcomings of the related art, the present disclosure relates to a pressure oscillation simulation device of deep coalbed methane and a method thereof, which can have advantages of a simple structure, easy operation and high reliability.

A device for simulating pressure oscillation of deep coalbed methane, includes:

a box, and a liquid discharge pipe arranged on a bottom portion of the box;

a gas source connected to the box through a gas injection pipe;

a water source connected to the box through a drainpipe, the drainpipe including a branch pipe; and a measuring system including a pressure measuring member and a liquidometer.

Wherein a first pressure measuring member is arranged on the bottom portion of the box and a second pressure measuring member is arranged on a top portion of the box.

Wherein the liquidometer is an ultrasonic liquid level detector arranged on an upper cover of the box.

Wherein a pressurizing device is arranged on the gas source.

Wherein the pressure measuring member further comprises a flowmeter arranged on the branch pipe.

Wherein the drainpipe is vertically disposed with a height of not less than 20 m, and an inner diameter of the box is 5-10 times of an inner diameter of the drainpipe.

Wherein the gas source is connected to the top portion of the box.

Wherein the pressure oscillation simulation device further includes a control terminal electrically connected to the measuring system.

A pressure oscillation simulation method of deep coalbed methane by using the device above mentioned, includes the following steps:

step 1, injecting liquid into the box by using the water source until a liquid level of the box reaches a set height, and stopping injecting liquid;

step 2, setting a pressure value of the second pressure measuring member, and injecting gas into the box by using the gas source until a pressure in the box reaches the pressure value of the second pressure measuring member that has been set;

step 3, resetting a liquid level of the liquidometer and opening the branch pipe, simultaneously opening the liquid discharge pipe arranged at the bottom portion of the box to discharge liquid until the liquid level of the box is reduced to the liquid level of the liquidometer that has been reset, and closing the liquid discharge pipe;

step 4, recording pressure changes of the pressure measuring member before and after the liquid discharge pipe is closed in the step 3, and simultaneously recording value changes of the flowmeter.

In an embodiment of the present disclosure, setting values in the step 1 through the step 3 are set according to actual stratum conditions.

The present disclosure provides advantages as below.

The present disclosure can simulate the coalbed pressure oscillation in a coalbed gas exploitation process and be of simple structure and high reliability, and can simulate influences of the pressure oscillation on a wellbore and a stratum environment in the coalbed exploitation process so as to provide reliable data support for an actual coalbed exploitation; the simulation method of the present disclosure can also accurately simulate the pressure oscillation of the wellbore and the stratum.

BRIEF DESCRIPTION OF THE DRAWINGS

FIG. 1 is a schematic view of a pressure oscillation simulation device of deep coalbed methane in accordance with an embodiment of the present disclosure;

The element labels according to the exemplary embodiment of the present disclosure shown as below:

box 1, bottom portion 101, top portion 102, upper cover 103, water resource 2, gas source 3, second pressure measuring member 4, liquidometer 5, first pressure measuring member 6, liquid discharge pipe 7, fourth valve 8, third valve 9, flowmeter 10, branch pipe 11, drainpipe 12, second valve 13, gas injection pipe 14, first valve 15, pressurizing device 16, control terminal 17.

DETAILED DESCRIPTION

The present disclosure is further described in detail in conjunction with embodiments and accompanying drawings below, but the examples cited are provided only to interpret the present disclosure, but not to limit the scope of the present disclosure.

An Embodiment

Referring to FIG. 1, a pressure oscillation simulation device of deep coalbed methane, includes:

a box 1, and a liquid discharge pipe 7 arranged on a bottom portion 101 of the box 1, specifically, in an embodiment of the present disclosure, the box 1 is cylindrical and includes an upper cover 103 arranged on a top portion 102 of the box 1, a diameter of the box 1 is 10 cm, and a height of the box 1 is 1.5 m. A fourth valve 8 is arranged on the liquid discharge pipe 7. One ordinary of skill in the art can arrange the boxes 1 with different shapes and sizes according to actual conditions.

a gas source 3 connected to the top portion 102 of the box 1 through a gas injection pipe 14, specifically, a pressurizing device 16 is arranged on the gas source 3, and a first valve 15 is arranged on the gas injection pipe 14; the gas injection pipe 14 is connected with the top portion 102 of the box 1. Because a certain pressure is occurred during testing the device, if the gas injection pipe 14 is set too low, when a liquid level during the test exceeds a connection point of the gas injection pipe 14 and the box 1, liquid flows backward to form a liquid column with a certain height in the gas injection pipe 14. In order to avoid the above situation, the gas source 3 is connected to the top portion 102 of the box 1. In an embodiment of the present disclosure, the gas source 3 is a nitrogen tank, the pressurizing device 16 is a pressurizing pump, and the gas injection pipe 14 is connected to the box 1 at a position with 10 cm below the upper cover 103 thereof. The gas injection pipe 14 can be set in different locations by one ordinary of skill in the art according to actual usage conditions, and the coalbed methane can be set as the gas source 3 by one ordinary of skill in the art according to actual formation conditions.

A water source 4 is connected to the box 1 through a drainpipe 12, and the drainpipe 12 includes a branch pipe 11;

in an embodiment of the present disclosure, the drainpipe 12 is vertically disposed with a height of 50 m and a diameter of 2 cm and configured to simulate a wellbore in a production process. It can be understood for one ordinary of skill in the art that the height and the diameter of the drainpipe 12 are not limited thereto, as long as the height of the drainpipe 12 is greater than the height of the box 1, thereby, different heights of the drainpipe 12 can be set according to different pressures of the box 1. In order to be closer to actual ground conditions and obtain more obvious experimental phenomena, the height of the drainpipe 12 is set to be not less than 20 m; meanwhile, in order to obtain the experimental phenomenon more obvious, the diameter of the drainpipe 12 is set to be between one fifth and one half of the diameter of the box 1.

The drainpipe 12 is a tap water tank arranged at a high position, one end of the water source 2 is connected with the drainpipe 12, a second valve 13 is arranged on the drainpipe 12 formed between the branch pipe 11 and the water source 2. The branch pipe 11 is set close to the water source 2, with specifically 30 cm therebetween. A flowmeter 10 and a third valve 9 are arranged on the branch pipe 11 in turn. One ordinary of skill in the art can also provide the water source 2 that includes injected water.

A measuring system includes a pressure measuring member and a liquidometer 5.

Specially, the pressure measuring member includes a first pressure measuring member 6 arranged on the bottom portion 101 of the box 1, and a second pressure measuring member 4 arranged on the top portion 102 of the box 1, the liquidometer 5 arranged on the upper cover 103 of the box 1, and the flowmeter 10 arranged on the branch pipe 11. In an embodiment of the present disclosure, both the first pressure measuring member 6 and the second pressure measuring member 4 are pressure sensors, and the liquidometer 5 is an ultrasonic liquid level detector. The second pressure measuring member 4 is configured to measure a gas pressure of the box 1, the first pressure measuring member 6 is configured to measure a hydraulic pressure at the bottom portion 101 of the box 1, the liquidometer 5 is configured to measure a height of a liquid level in the box 1, and the flowmeter 10 is configured to measure amount of liquid ejected from the branch pipe 11.

The device further includes a control terminal 17 electrically connected to each of the first pressure measuring member 6, the second pressure measuring member 4, the liquidometer 5 and the flowmeter 10. In an embodiment of the present disclosure, the control terminal 17 is a control computer.

In another embodiment of the present disclosure, a camera (not shown) can also be installed at an outlet of the branch pipe 11 for recording oscillation of the branch pipe 11 when spraying water, so as to provide video data support for subsequent researches.

After the device of the present disclosure is described in detail, the pressure oscillation simulation of the deep coalbed methane exploitation using the device will be described below.

A pressure oscillation simulation method of deep coalbed methane includes:

step 1, injecting liquid into the box 1 by using the water source 2 until a liquid level of the box 1 reaches a set height, and stopping injecting liquid and closing the second valve 13 so as to simulate a liquid level of a target stratum;

step 2, setting a pressure value of the second pressure measuring member 4, opening the first valve 15 and injecting gas into the box 1 at a constant speed by using the gas source 3 until the pressure in the box 1 reaches the pressure value of the second pressure measuring member 4 that has been set, and closing the first valve 15; wherein injected gas and an appropriate pressure are configured to simulate the coalbed methane in the target stratum;

step 3, resetting a liquid level of the liquidometer 5 and opening the third valve 9 and the fourth valve 8, discharging liquid by the liquid discharge pipe 7 until the liquid level of the box 1 is reduced to the set height, and closing the fourth valve 8. The step 3 is configured for simulating instantaneous closure of coalbed cracks due to insufficient pressures of the liquid column, and the pressure oscillation is generated in the device after the step 3 is finished.

step 4, recording pressure changes of the first pressure measuring member 6 and the second pressure measuring member 4 before and after the liquid discharge pipe 7 is closed in the step 3, and simultaneously recording value changes of the flowmeter 10. When liquid output of the branch pipe 11 is decreased to zero, the whole simulation process is ended.

Set values of the liquidometer and the second pressure measuring member in the step 1 to the step 3 can be set in proportion according to actual formation conditions, and a set value in the step 3 is higher than a set value in the step 4. The step 1 to the step 4 are repeated to obtain parameters such as a liquid discharge amount, a liquid discharge state under the conditions of different liquid levels and gas pressures, so as to provide good data support for actual coalbed methane development.

From the step 1 to the step 3 above, the set values of the liquidometer and the second pressure measuring member can be determined by the following method: 1. according to purposes of experiments: for example, when the oscillation condition under the same liquid level and a different pressure condition is to be obtained, the pressure can be set based on a certain proportion according to an actual stratum condition, a height of the liquid discharge pipe and a height of the box; 2. parameters can be set according to a reduction of stratum pressures and the liquid level of the coalbed according to a certain proportion.

The above embodiments are only a description of the present disclosure and the foregoing description is not in any form a limitation to the present disclosure. Any variation or replacement made by one of ordinary skill in the related art without departing from the spirit of the present disclosure shall fall within the protection scope of the present disclosure. Therefore, the protection scope of the present disclosure shall be subject to the protection scope of the claims.

What is claimed is:

1. A pressure oscillation simulation method of deep coalbed methane comprising the following steps:
   step 1, providing a pressure oscillation simulation device of the deep coalbed methane, the device comprising:
   a cylindrical box, and a liquid discharge pipe arranged on a bottom portion of the box;
   a gas source connected to a top portion of the box through a gas injection pipe;
   a water source connected to the box through a drainpipe, the drainpipe comprising a branch pipe, and a height of the drainpipe greater than that of the box;
   a measuring system comprising a pressure measuring member and a liquidometer arranged on an upper cover of the box, the pressure measuring member comprising a first pressure measuring member arranged on the bottom portion of the box, and a second pressure measuring member arranged on the top portion of the box;
   step 2, injecting liquid into the box by using the water source until a liquid level of the box reaches a set height, and stopping injecting liquid;
   step 3, setting a pressure value of the second pressure measuring member, and injecting gas into the box by using the gas source until a pressure in the box reaches the pressure value of the second pressure measuring member that has been set;
   step 4, resetting a liquid level of the liquidometer and opening the branch pipe, simultaneously opening the liquid discharge pipe arranged at the bottom portion of the box to discharge liquid until a liquid level of the box is reduced to the liquid level of the liquidometer that has been reset, and closing the liquid discharge pipe; and
   step 5, recording pressure changes of the pressure measuring member before and after the liquid discharge pipe is closed in the step 3, and simultaneously recording value changes of the flowmeter.

2. The method as claimed in claim 1, wherein the liquidometer is an ultrasonic liquid level detector.

3. The method as claimed in claim 1, wherein a pressurizing device is arranged on the gas source.

4. The method as claimed in claim 1, wherein the pressure measuring member further comprises a flowmeter arranged on the branch pipe.

5. The method as claimed in claim 1, wherein the drainpipe is vertically disposed with the height of not less than 20 m, and an inner diameter of the box is 5-10 times of an inner diameter of the drainpipe.

6. The method as claimed in claim 1, wherein the pressure oscillation simulation device further comprises a control terminal electrically connected to the measuring system.

* * * * *